(12) United States Patent
Schroeder et al.

(10) Patent No.: US 9,393,662 B2
(45) Date of Patent: Jul. 19, 2016

(54) APPARATUS AND METHOD FOR GRINDING ROTARY BLADES

(75) Inventors: Jens Schroeder, Neubrandenburg (DE); Sabine Spillner, Munich (DE); Gerd Lischinski, Schoenbeck (DE); Maik Herrmann, Neubrandenburg (DE); Thomas Lunow, Neubrandenburg (DE)

(73) Assignee: WEBER MASCHINENBAU GMBH BREIDENBACH, Breidenbach (DE)

( * ) Notice: Subject to any disclaimer, the term of this patent is extended or adjusted under 35 U.S.C. 154(b) by 871 days.

(21) Appl. No.: 13/486,683

(22) Filed: Jun. 1, 2012

(65) Prior Publication Data
US 2012/0309266 A1 Dec. 6, 2012

(30) Foreign Application Priority Data

Jun. 6, 2011 (DE) .......................... 10 2011 103 418
Mar. 20, 2012 (DE) .......................... 10 2012 005 566

(51) Int. Cl.
| B26D 7/12 | (2006.01) |
| B24B 3/46 | (2006.01) |
| B24B 3/40 | (2006.01) |
| B24B 49/12 | (2006.01) |
| B26D 1/14 | (2006.01) |

(52) U.S. Cl.
CPC . *B24B 3/40* (2013.01); *B24B 3/463* (2013.01); *B24B 49/12* (2013.01); *B26D 7/12* (2013.01); *B26D 1/14* (2013.01); *B26D 2210/02* (2013.01)

(58) Field of Classification Search
CPC ............ B24B 49/12; B24B 3/00; B24B 3/36; B24B 3/363; B24B 3/40; B24B 3/46; B24B 3/463; B26D 7/12

USPC ......... 451/6, 45, 56, 194, 195, 196, 208, 261, 451/262, 293
See application file for complete search history.

(56) References Cited

U.S. PATENT DOCUMENTS

| 2,207,433 | A | * | 7/1940 | Haswell | .......................... 451/420 |
| 2,429,300 | A | * | 10/1947 | Wilbert | .............................. 76/41 |
| 2,716,908 | A | * | 9/1955 | Lundberg | ............................ 76/40 |

(Continued)

FOREIGN PATENT DOCUMENTS

| DE | 1933993 U | 3/1966 |
| DE | 4408566 A1 | 9/1994 |

(Continued)

OTHER PUBLICATIONS

German Search Report for Corresponding German Application No. DE102011103418.1, dated Mar. 16, 2012; 5 Pages.

(Continued)

*Primary Examiner* — Eileen Morgan

(57) ABSTRACT

The present disclosure relates to apparatus for grinding rotary blades, in particular scythe-like blades or circular blades, in particular for machines for slicing food products. The apparatus includes at least one mount for a rotary blade to which the rotary blade can be attached and at least one grinding tool. The grinding tool and the rotary blade attached in the mount are movable relative to one another such that a blade edge extending at the periphery of the rotary blade can be ground by the grinding tool. The apparatus includes a measuring device for determining the extent of the blade edge and a control which is designed to use the determined blade edge extent for controlling the relative movement between the grinding tool and the rotary blade.

9 Claims, 6 Drawing Sheets

(56) References Cited

U.S. PATENT DOCUMENTS

| | | | |
|---|---|---|---|
| 2,766,566 A * | 10/1956 | Gage | 451/422 |
| 4,173,846 A * | 11/1979 | Steiner et al. | 451/422 |
| 5,152,203 A * | 10/1992 | Wierschke | 83/13 |
| 5,327,686 A * | 7/1994 | Park | 451/1 |
| 5,556,321 A | 9/1996 | Kasahara et al. | |
| 5,632,666 A * | 5/1997 | Peratello et al. | 451/5 |
| 5,941,148 A * | 8/1999 | Miller et al. | 83/174 |
| 6,224,468 B1 * | 5/2001 | Blume et al. | 451/48 |
| 6,503,135 B2 | 1/2003 | Clauss et al. | |
| 6,955,584 B2 | 10/2005 | Giurgiuman et al. | |
| 7,125,312 B2 * | 10/2006 | Castanares et al. | 451/5 |
| 2005/0159079 A1 * | 7/2005 | Astigarraga Castanares et al. | 451/5 |
| 2012/0184186 A1 * | 7/2012 | Graham et al. | 451/45 |

FOREIGN PATENT DOCUMENTS

| | | |
|---|---|---|
| DE | 4316789 A1 | 11/1994 |
| DE | 10035743 A1 | 4/2002 |
| DE | 10205146 A1 | 8/2003 |
| DE | 20314680 U1 | 11/2003 |
| DE | 102005013363 A1 | 12/2005 |
| DE | 102009006912 A1 | 8/2010 |
| EP | 1598159 A1 | 11/2005 |
| JP | 2001038598 A | 2/2001 |
| WO | WO2007097724 A2 | 8/2007 |

OTHER PUBLICATIONS

Translation of German Search Report for Corresponding German Application No. DE102011103418.1, dated Mar. 16, 2012; 6 Pages.

Translation of German Search Report relating to German Patent Application No. 102012005566.8 dated Jan. 11, 2013 (5 pgs).

* cited by examiner

APPARATUS AND METHOD FOR GRINDING ROTARY BLADES

CROSS-REFERENCE TO RELATED APPLICATIONS

This application claims the benefit of German Application No. DE102012005566.8, filed Mar. 20, 2012 and German Application No. DE102011103418.1, filed Jun. 6, 2011. The disclosures of the above applications are incorporated herein by reference in their entirety.

FIELD

The present invention relates to an apparatus for grinding rotary blades, in particular scythe-like blades or circular blades, in particular for machines for slicing food products, as well as to a method for grinding rotary blades.

BACKGROUND

Rotary blades are used in machines for slicing food products which are also called slicers. The rotary blades wear in this process and become blunt so that they have to be ground. In known grinding apparatus for rotary blades, a copy plate is used which is a copy of the blade type to be ground. To grind a rotary blade belonging to a blade type, the blade edge present at the copy plate is traveled along. This "travel movement" is transferred via a copying device to a grinding tool which correspondingly travels along the blade edge of the rotary blade and grinds the rotary blade in so doing.

It is disadvantageous in this that—in particular when a plurality of different blade types should be ground using a grinding apparatus—a separate copy plate has to be kept in stock for each blade type. This not only incurs costs. It is rather the case that the time effort required for grinding a rotary blade can also increase in that the copy plate required for the rotary blade to be ground has to be attached to the grinding apparatus before it is possible to start grinding. It is furthermore disadvantageous that a copy plate is only a "copy" of an unused rotary plate. User-caused wear phenomena and/or special features at the blade edge of the rotary blade to be ground are thus not taken into account in the copy plate. This can result in a sub-optimal grinding result.

It is the underlying object of the present invention to provide a possibility by which a rotary blade can be ground in an improved manner.

The object is satisfied in each case by an apparatus having the features of the independent claims. Preferred further developments and embodiments of the invention are set forth in the dependent claims.

SUMMARY

An apparatus in accordance with the invention for grinding rotary blades, in particular scythe-like blades or circular blades, in particular for machines for slicing food products, includes at least one mount for a rotary blade to which the rotary blade is attachable; at least one grinding tool, with the grinding tool and the rotary blade attached in the mount being movable relative to one another such that a blade edge extending at the periphery of the rotary blade can be ground by the grinding tool; a measuring device for determining the extent of the blade edge; and a control which is designed to use the determined blade edge extent to control the relative movement between the grinding tool and the rotary blade.

It is thus possible with the apparatus in accordance with the invention to determine the blade edge extent of the rotary blade to be ground before the grinding procedure. Copy plates are thus no longer needed. In addition, blade-specific wear phenomena and/or deviations from the blade edge extent with respect to the "ideal" extent of a still unused blade can be taken into account in this manner so that an ideal grinding result can be achieved.

"Blade edge extent" is also understood within the framework of this disclosure as the extent of the blade edge angle which can vary along the circumference of the blade, while the cutting edge lies on a circle, for example.

The measuring apparatus is preferably designed to detect as a blade edge extent a cutting edge or another feature of the rotary blade corresponding to the blade edge extent and/or allowing a deduction of the blade edge extent. The cutting edge can be detected particularly easily, for example, by a light barrier, which promotes the determination of the blade edge extent. The feature which allows a deduction of the blade edge extent can, for example, be a plurality of elevated portions or an edge at the transition from one blade edge region to a further inwardly disposed region of the blade which are/is arranged on a side of the blade body following the extent of the blade edge so that the blade edge extent can be deduced from the detected extent of the elevated portions or of the edge. A blade having such elevated portions is known, for example, from DE 10 2009 006 912 A1.

The measuring device can work in a contactless manner. The measuring device can thereby be protected against contamination and wear.

In accordance with a preferred embodiment of the invention, the measuring device has a detection region with which only a section of the blade edge can be detected. The position of the section can thereby be determined relatively precisely and the blade edge extent can be determined with sufficient accuracy from a plurality of detected positions of a plurality of blade edge sections lying along the blade edge extent. A point-by-point detection of the blade edge can also be provided so that the blade edge extent can be determined from a plurality of points detected in this manner, for example, by interpolation.

The measuring device and the rotary blade are preferably movable relative to one another such that the blade edge is movable through the detection zone of the measuring device and in so doing can be detected continuously or section-wise. The blade edge extent can thereby be detected simply and fast with a point-by-point or section-wise detection of the blade edge.

The measuring device can be traveled in accordance with a preferred further development of the invention. It is possible in this manner by traveling the measuring device to detect a section of the blade edge intersecting the travel path as soon as said section moves into the detection region of the measuring device.

The measuring device preferably has a light barrier, in particular a forked light barrier. A reliable measuring device can thereby simultaneously be realized inexpensively.

The measuring device is particularly preferably designed to determine the position at which the light barrier is interrupted or released by a section of the blade edge as a measured value for the position of this section. The position of a section detected by means of the light barrier can, for example, thereby be detected with respect to a travel path of the light barrier. This is advantageous since the travel path of the light barrier can be measured particularly simply, for example by means of an encoder which is coupled to a drive for traveling the light barrier.

The measuring device is in a particularly advantageous manner designed to use the set of all positions thus detected at least as a basis for the blade edge extent. The positions can in this respect be assumed directly as the blade edge extent or further positions can be calculated, for example by interpolation, so that the blade edge extent can be determined with a high accuracy.

The rotary blade is preferably movable and the measuring device is designed to determine the position of the rotary blade. It is thereby possible to detect the positions in respective dependence on the position of the rotary blade and to determine the blade edge extent, for example, in the form of value pairs, with a value pair including a detected position of a section of the blade edge, that is a part of the blade edge extent, and the associated position of the rotary blade.

The blade edge extent can be determined particularly easily when the rotary blade is rotatable about an axis of rotation provided for the cutting operation and when the measuring device can be traveled in a linear manner such that the position of a section of the blade edge of the rotary blade can be determined for a plurality of rotary positions of the rotary blade in each case by means of the measuring device.

A memory can be provided for the at least temporary storage of at least one determined blade edge extent. All the required blade edge extents, for example previously taught or input blade edge extents, which correspond to blades to be ground, can be stored in the memory.

In accordance with a further preferred embodiment, which is also claimed for itself, that is independently, the invention relates to an apparatus for grinding rotary blades, in particular scythe-like blades or circular blades, in particular for machines for slicing food products, having at least one mount for a rotary blade to which the rotary blade can be attached; at least one grinding tool, with the grinding tool and the rotary blade attached in the mount being able to be moved relative to one another such that a blade edge extending at the periphery of the rotary blade can be ground: and a pivot device for the grinding tool, with the pivot device being formed so that the grinding tool is pivotable about a pivot axis which extends through a grinding point at which the blade edge and the grinding tool contact one another during the grinding process.

The grinding tool can comprise a grinding wheel which contacts the blade edge at the grinding point and which is pivotable about the pivot axis. The grinding angle can be set in a simple manner by the pivotability of the grinding wheel about the pivot axis extending through the grinding point and can in particular also be varied during the grinding process, with the angle between the grinding wheel and the blade edge being called the grinding angle. It is thus possible, for example, to set the grinding angle during the grinding process in dependence on a determined or predefined blade edge extent.

The grinding tool can have a deburring tool which forms a V-shaped mount for the rotary blade at least approximately together with the grinding wheel and which contacts the blade edge at a deburring point. Burrs arising due to the grinding process can, for example, be removed from the blade edge by the deburring wheel. It is advantageous in this respect if the deburring wheel is pivotable about the pivot axis together with the grinding wheel and/or independently of the grinding wheel so that the deburring angle the deburring wheel includes with the blade edge can be varied, in particular during the grinding process and so that it can be set, for example, in dependence on the determined blade edge extent. It is particularly advantageous if the deburring point likewise extends through the pivot axis since then the deburring point does not "migrate", or only migrates slightly, on the deburring wheel when the latter is pivoted.

The grinding wheel and the deburring wheel are preferably arranged offset from one another along the pivot axis, in particular such that the two wheels are directly opposite one another with respect to the pivot axis. For example, the two wheels can be arranged directly next to one another while forming the V-shaped mount along the pivot axis so that they are always in contact or only have a slight spacing from one another (for example a spacing of less than 5 millimeters).

In accordance with a further development of the invention, the rotary blade and the grinding tool can be positioned relative to one another such that the pivot axis is aligned tangentially to the cutting edge present at the respective grinding point, in particular during the grinding process. A particularly good grinding result is achieved in this manner.

The pivot device for the grinding tool preferably has at least one pivot bearing whose axis of rotation coincides with the pivot axis of the grinding tool. The grinding device can thereby be pivoted in a simple manner by means of the pivot bearing during grinding and the grinding angle between the grinding wheel and the blade edge can be matched ideally. This is in particular advantageous with rotary blades whose blade edge has a variable blade edge angle. The blade edge angle is in this respect the angle which the blade edge surface of the blade edge includes with a blade edge plane extending perpendicular to the axis of rotation of the rotary blade. A blade having a variable blade edge angle is known from WO 2009/027080 A1, for example. The provision of a pivot bearing which includes an axis of rotation coinciding with the pivot axis, has the advantage that the grinding tool can be pivoted extremely precisely and extremely resistantly to disturbance about the grinding point by a rotary movement taking place about the axis of rotation and thus the grinding angle can be matched in a simple manner during the grinding process.

The grinding wheel and the deburring wheel are preferably each attached to a pivot arm, with both pivot arms being fastened to the pivot bearing. The two wheels can be pivotably fastened to the pivot bearing in a simple construction manner by means of the pivot arms.

It is advantageous if the two wheels are rotatable about a common axis of rotation of the pivot bearing for the common. The grinding wheel and the deburring wheel can thus pivot with respect to the grinding point and deburring point, which is in turn advantageous on the grinding and deburring of rotary blades with a variable blade edge angle.

Each pivot arm can also be rotatable about the common axis of rotation of the pivot bearing independently of the respective other pivot arm for pivoting the grinding wheel or deburring wheel independently of the respective other wheel. The two wheels can thus be rotated about the axis of rotation together or independently of one another and can therefore be pivoted about the pivot axis coinciding with the axis of rotation so that the deburring angle or grinding angle is adjustable by rotation of the pivot arms.

The grinding wheel and the deburring wheel can have a common pivot drive. The grinding tool can thereby have a compact design so that the principle of the pivot bearing having an axis of rotation coinciding with the pivot axis is utilized in a particularly advantageous manner.

The length of each pivot arm is preferably variable so that the spacing between the wheel arranged at the respective pivot arm is adjustable with respect to the pivot bearing. The spacing between the grinding point and the pivot bearing can thereby be adjusted and adapted, for example, to differently sized blades.

The grinding tool can preferably be traveled, in particular in a linear manner, so that the grinding tool and the rotary blade to be ground can be held in contact with one another during the grinding process, in particular if the rotary blade has a varying radius as is the case with a scythe-like blade.

The grinding apparatus can include a display which indicates the instantaneous grinding angle and/or deburring angle or other parameters relating to the grinding process.

The invention also relates to a method for grinding rotary blades, in particular scythe-like blades or circular blades, in particular for machines for slicing food products, using an apparatus in accordance with the invention. In this respect, the extent of the blade edge of the rotary blade is determined and the rotary blade is subsequently ground, with a relative movement between the rotary blade and a grinding tool being controlled by means of the determined blade edge extent.

BRIEF DESCRIPTION OF THE DRAWINGS

The invention will be described in the following by way of example with reference to the drawings. There are shown, schematically in part.

DETAILED DESCRIPTION

Figure 1:
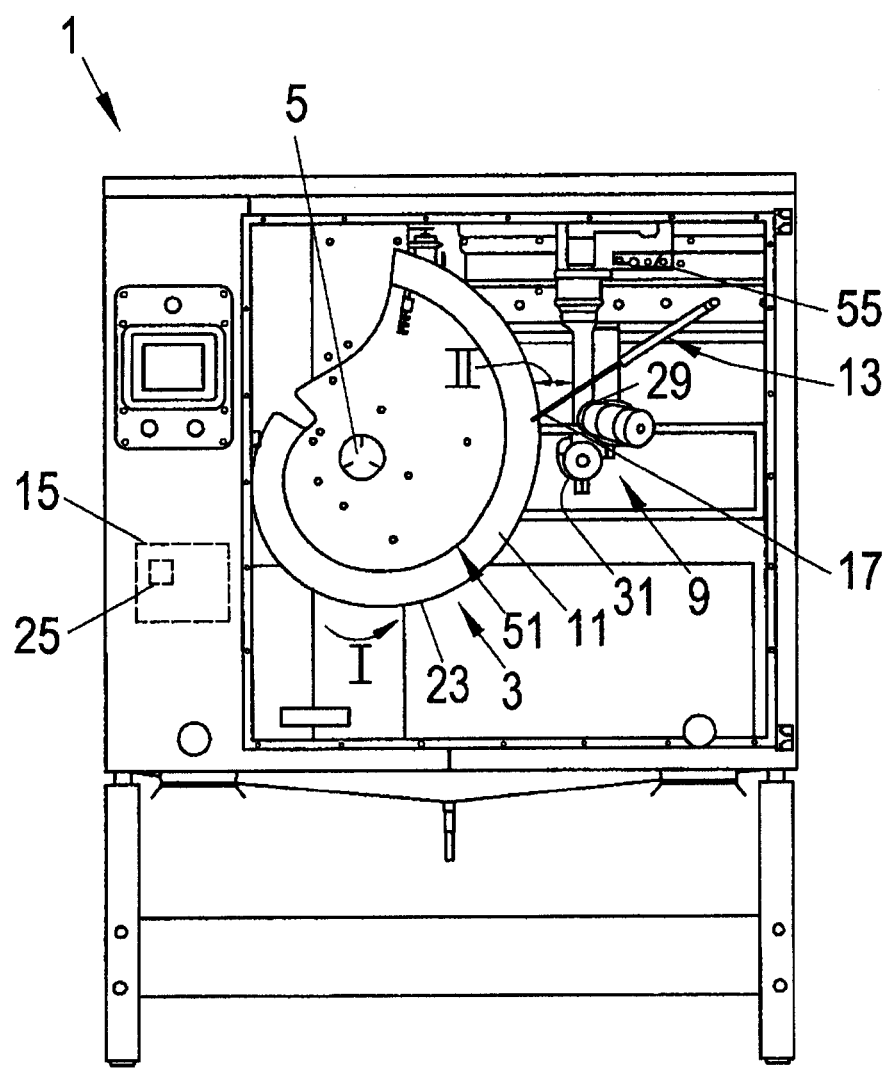
FIG. 1 a lateral view of an apparatus in accordance with the invention for grinding rotary blades.
Figure 4:
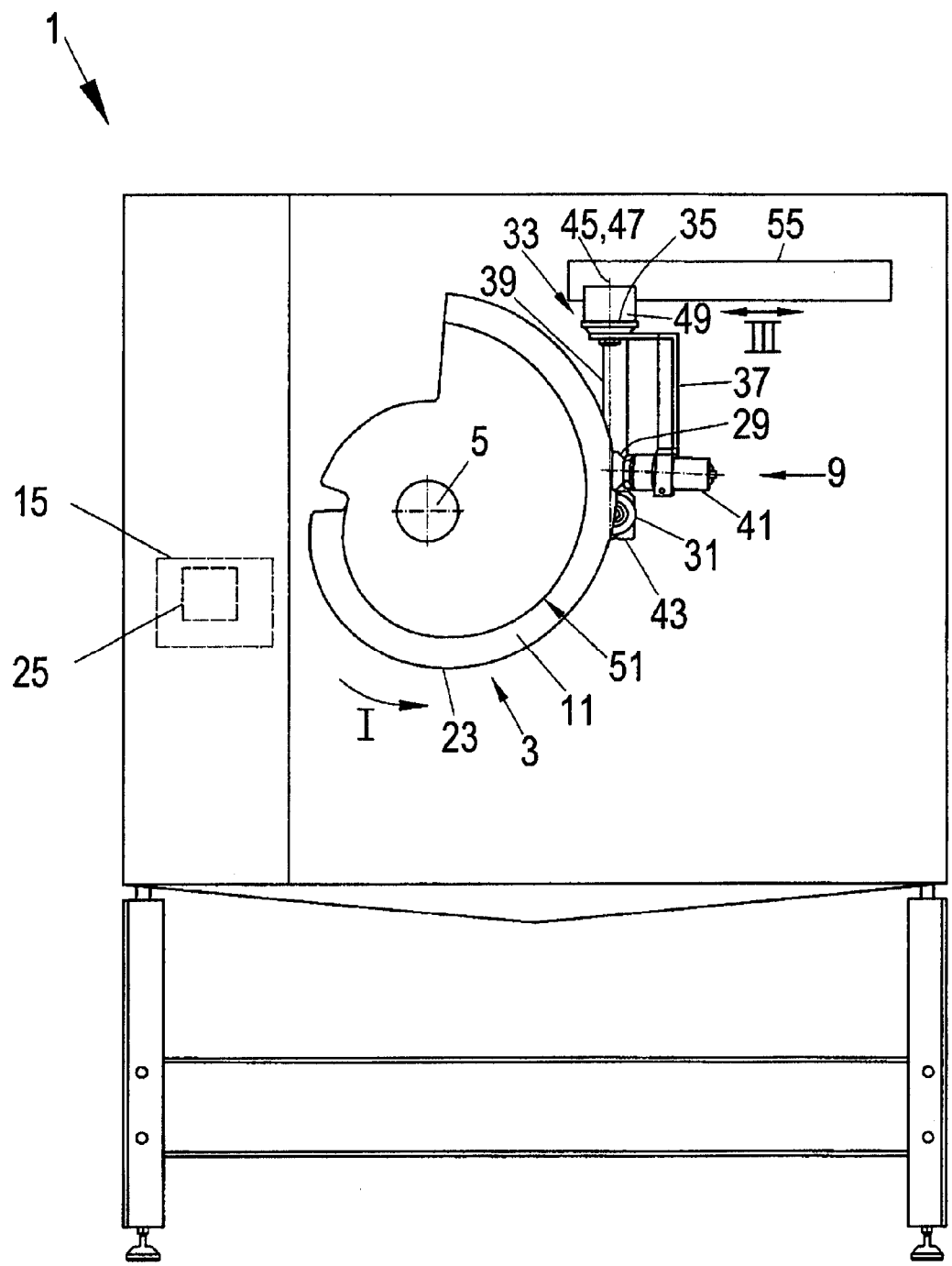
FIG. 4 a further lateral view of the apparatus of FIG. 1.

The grinding apparatus 1 shown is provided for grinding rotary blades 3. Such rotary blades 3 are used, for example, in high-speed cutting machines for slicing food products which are also called slicers. To attach a rotary blade 3 to be ground to the grinding apparatus 1, a mount 5 is provided onto which a mount opening 7 of the rotary blade 3 is placed and to which the rotary blade 3 is fastened (cf. FIGS. 1 and 4).

The grinding apparatus 1 has a grinding tool 9. The rotary blade 3 and the grinding tool 9 are movable relative to one another so that a blade edge 11 extending at the periphery of the rotary blade 3 can be ground by the grinding tool 9. An automatic determination of the extent of the blade edge 11 takes place in the apparatus 1 before the grinding by a measuring device 13 which is coupled with a control 15 so that the determined blade edge extent can be provided to the control 15. The control 15 is in turn coupled with the grinding tool 9 and with a drive (not show) for the mount 5. The mount 5 and the rotary blade 3 fastened thereto can be rotated in a direction of rotation I by the drive and the control 15 is designed to use the determined blade edge extent to control the relative movement between the grinding tool 9 and the rotary blade 3.

Figure 2:
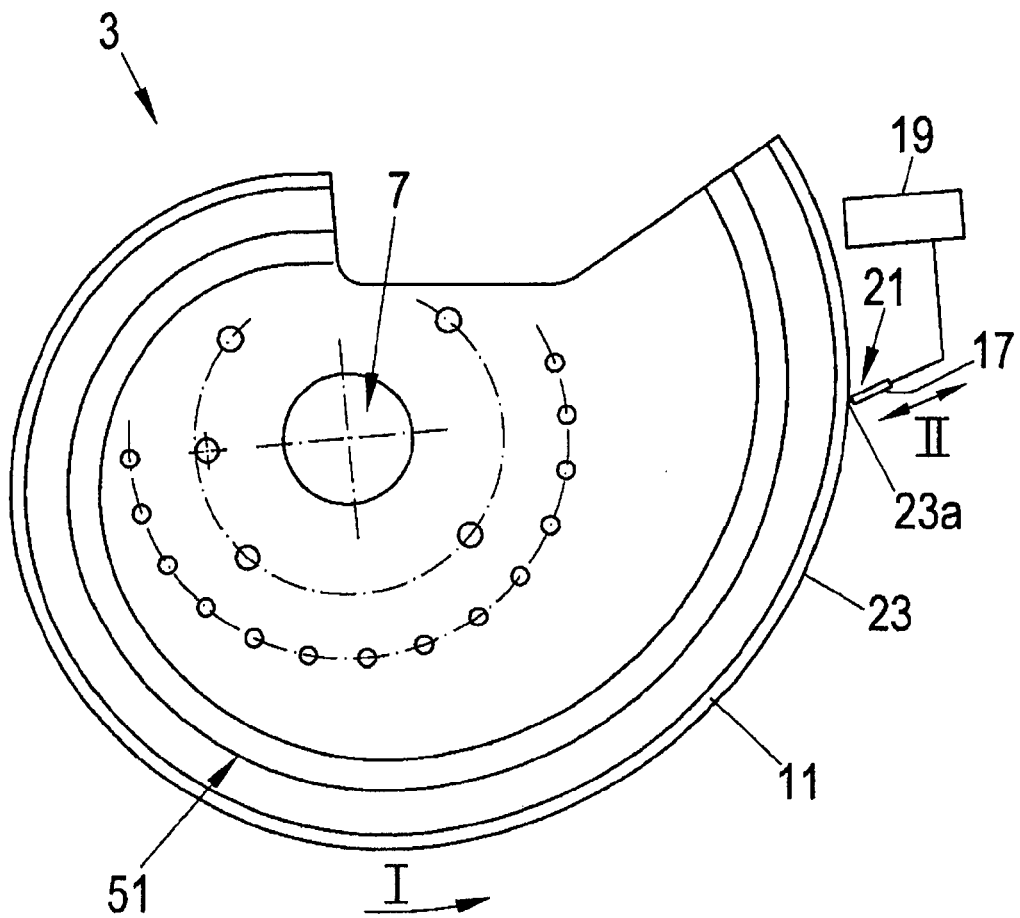
FIG. 2 a lateral view of the rotary blade and of a measuring device of the apparatus of FIG. 1.
Figure 3:
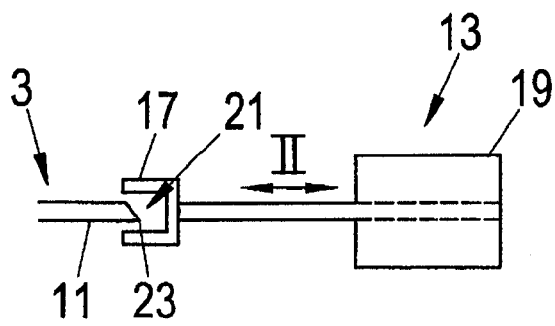
FIG. 3 a plan view of the rotary blade and of the measuring device of FIG. 2.

To detect the extent of the blade edge 11, the measuring device 13 has a forked light barrier 17 which is coupled with a linear motor 19 (cf. FIGS. 2 and 3) and is arranged so that the forked light barrier 17 is located radially outwardly in front of the blade edge 11, cf. FIG. 2. The forked light barrier 17 can be moved along a travel path II (cf. the double arrow in FIGS. 1 to 3) by the linear motor 19 so that the forked light barrier 17 is moved toward or away from the rotary blade 3.

The forked light barrier 17 has a detection zone 21 within which a light path extends between a transmitter and a receiver (both not shown) of the forked light barrier 17. If the forked light barrier 17 is moved from radially outwardly toward the rotary blade 3 (cf. FIGS. 2 and 3), the light path is interrupted by the section 23a of a radially outwardly disposed cutting edge 23 intersecting the travel path II as soon as the section 23a moves into the detection zone 21. On an opposite movement of the forked light barrier 17, the light path is again released so that the section 23a again exits the detection zone.

In the apparatus 1, the rotary blade 3 is rotated in the direction of rotation I so that the respective section 23a of the cutting edge 23 intersecting the travel path II of the forked light barrier 17 can be detected for a plurality of rotational positions of the rotary blade 3. The determination of the extent of the blade edge 11 then takes place from the set of the sections 23a thus detected. In this respect, the respective position of the light barrier 17, with respect to the travel path II, is determined by the measuring device 13 as the measured value for the position of a detected section 23a, for example by means of an encoder (not shown) coupled with the linear motor 19. In addition, the measuring device 13 is designed to determine the respective position of the rotary blade 3, with respect to the direction of rotation I, in which the respective section 23a is detected. For this purpose, the measuring device 13 is coupled with a positional sensor, not shown, which is designed and arranged to detect the position of the rotary blade 3, for example as an angle of rotation with respect to a zero point.

The measuring device 13 therefore determines a plurality of value pairs in the described embodiment. In this respect, a value pair includes the position of the respective section 23a of the cutting edge 23 intersecting the travel path II, said position being determined with respect to the travel path II, and includes the associated rotational position of the rotary blade 3. The thus determined value pairs can be assumed directly as the blade edge extent. Alternatively, the measured value which indicates the position of a section 23a with respect to the travel path II can be converted for each value pair into an interval value which indicates the interval between the respective section 23a and the center of the mount 5 or of the mount opening 7. The extent of the cutting edge 23 can thus be determined in polar coordinates with the center of the mount 5 or the mount opening 7 as the origin. Further value pairs can be calculated by interpolation depending on the number of the value pairs determined in this manner.

Alternatively, the measuring device could, for example, be formed so that an edge 51 of the rotary blade 3 extending in accordance with the blade edge 11 (cf. FIGS. 1 and 2) is detected. It is in principle also conceivable to determine the blade edge extent by means of a camera and by image evaluation. A relative movement between the blade 3 and the measuring device 13 is therefore not necessary for the determination of the blade edge extent.

The blade edge extent thus determined is transmitted by the measuring device 13 to the control 15 and is there stored at least temporarily in a memory 25. In addition, the forked light barrier 21 is moved away from the rotary blade 3 after the determination of the blade edge extent.

To grind the rotary blade 3, the machining of the blade edge 11 takes place in a manner known per se by a grinding wheel and deburring wheel 29, 31 of the grinding tool 9. In this respect, the blade edge 11 is contacted by the grinding wheel 29 at a grinding point 27 and by the deburring wheel 31 at a deburring point 53 (cf. FIG. 5). The grinding tool 9 can in this respect be positionable relative to the rotary blade 3 such that, in particular during the total grinding process, the pivot axis 45 is aligned tangentially to the cutting edge 23 extending through the respective grinding point 27. The rotary blade 3 is rotated in the direction of rotation I and is thus moved past the grinding tool 9. The control 15 is—as mentioned—designed to control the relative movement between the rotary blade 3 and the grinding tool 9 such that the blade edge 11 is "traveled along" by the grinding tool 9 in accordance with the determined blade edge extent. In this respect, the grinding tool 9, can be traveled by means of a linear motor along a travel path III (cf. FIG. 4) to hold the grinding point 27 and the deburring point 53 in contact with the blade edge 11 while the rotary blade 3 is moved past the grinding tool 9. The grinding tool 9 is thus tracked to compensate the changing radius of the rotary blade 3.

Figure 4A:
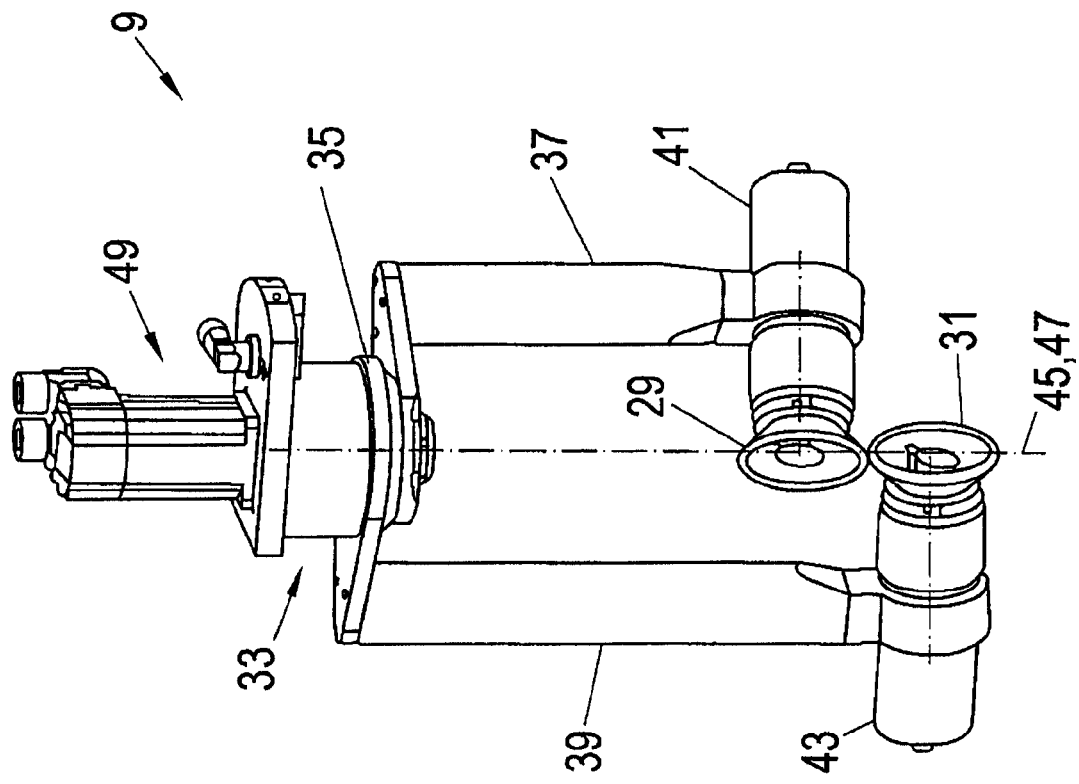
FIG. 4A a perspective view of a grinding tool and of a pivot device, for example for a grinding tool of the apparatus of FIGS. 1 and 4.
Figure 4B:
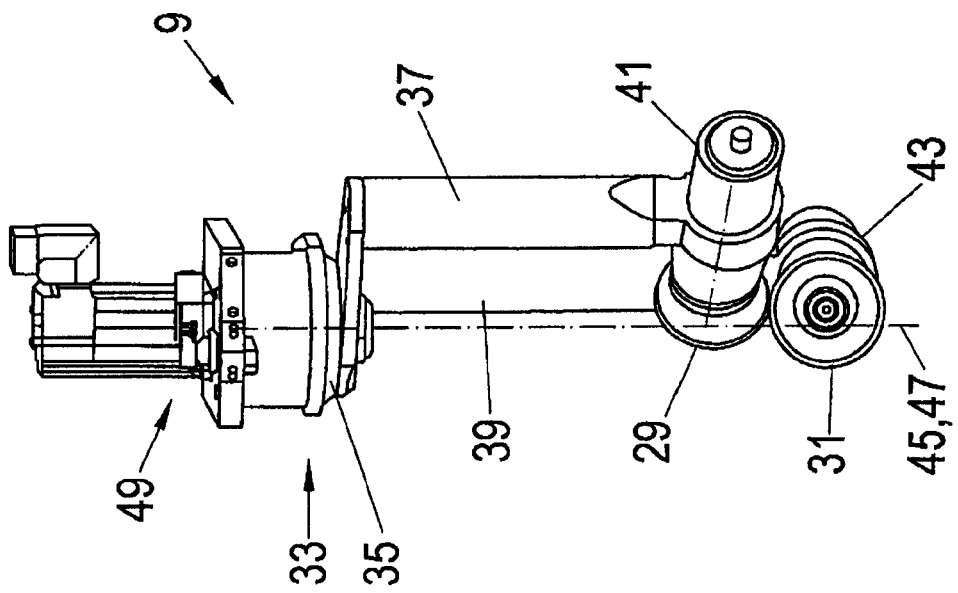
FIG. 4B an additional perspective view of the grinding tool and of the pivot device of FIG. 4A.

The grinding tool 9 shown in more detail in FIGS. 4A and 4B is fastened to the apparatus 1 via a pivot device 33. The pivot device 33 has a pivot bearing 35 at which a first and second pivot arm 37, 39 are rotatably arranged. A drive 41 for the grinding wheel 29 is arranged at the first pivot arm 37 and a drive 43 for the deburring wheel 31 at the second pivot arm 39. The grinding wheel and deburring wheel 29, 31 are pivotable by the pivot device 33 about a pivot axis 45 which extends through the grinding point 27 and the deburring point 53 and which coincides with the axis of rotation 47 of the pivot bearing 35 (cf. FIG. 5), which is advantageous for the grinding of blades having varying blade edge angles since a pivoting or rotating of the two wheels 29, 31 can thus also take place in a simple manner during the grinding process, in particular without changing the position of the grinding points and deburring points 27, 53 on the respective wheel 29, 31.

Figure 5:
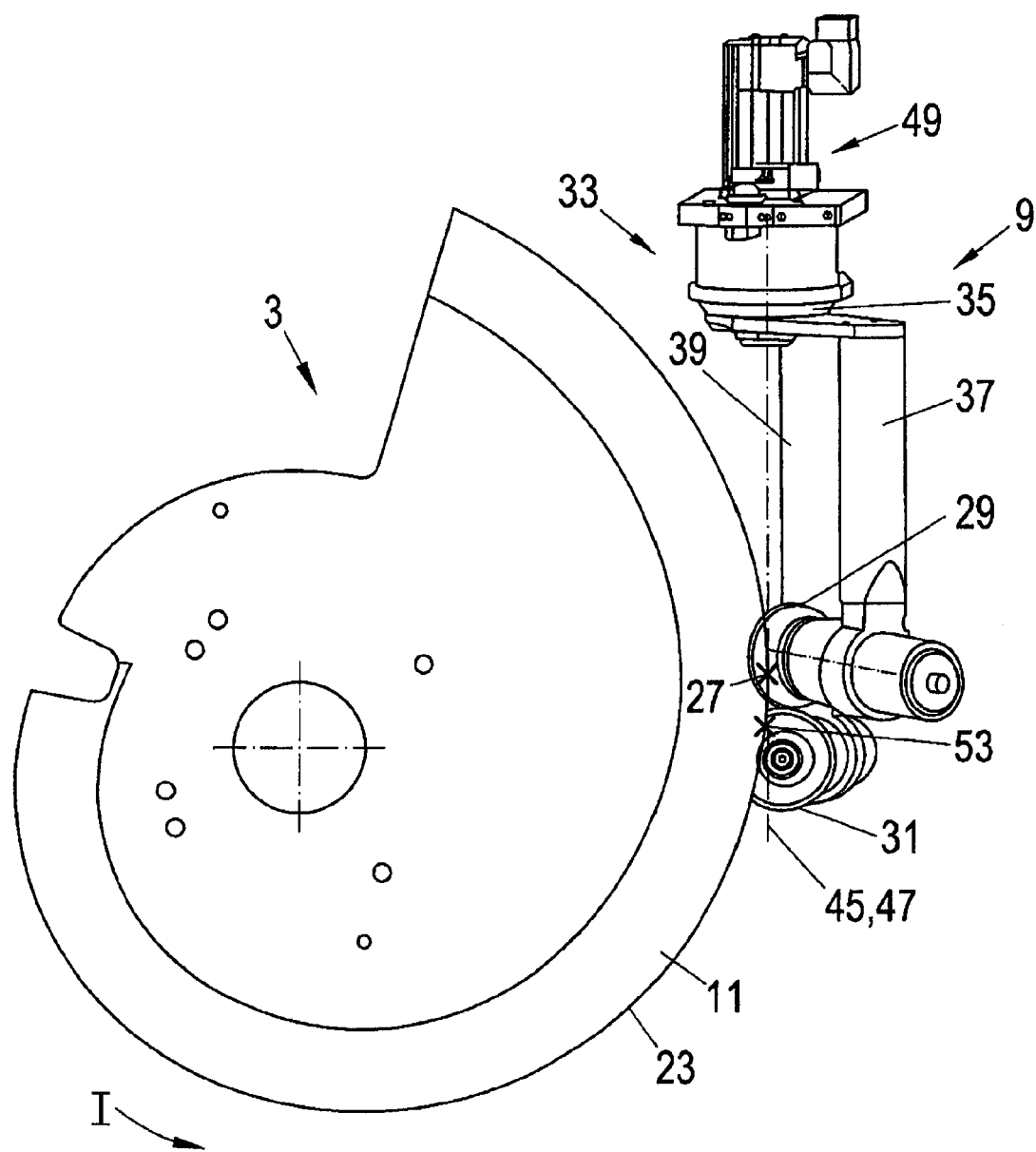
FIG. 5 a lateral view of the rotary blade, of the grinding tool and of the pivot device of the apparatus of FIGS. 1 and 4.

As can in particular be seen in FIG. 5, the two wheels 29, 31 form a V-shaped mount for the cutting blade 3. The two wheels 29, 31 are therefore arranged at different sides of the blade 3, i.e. the one blade at the front side and the other blade at the rear side of the blade 3. The two wheels 29, 31 are in this respect arranged offset from one another with respect to the pivot axis 45. As shown, the two wheels 29, 31 are arranged directly above one another with respect to the pivot axis 45 so that they are directly opposite one another, i.e. are arranged in direct proximity to one another while forming the V-shaped mount. The two wheels 29, 31 can thus contact one another or only have a small spacing from one another. The grinding point 27 and the deburring point 53 are likewise offset from one another along the pivot axis 45 due to the offset arrangement of the wheels 29, 31.

For the common pivoting of both wheels 29, 31 about the pivot axis or axis of rotation 45, 47, the pivot bearing 35 is coupled with a pivot drive 49, in particular controllable by the control 15, so that both wheels 29, 31 can be pivoted by the pivot drive 49 during the grinding and the grinding angle and the deburring angle can thus be matched to the blade edge angle of the blade 3. This type of pivoting is extremely precise and additionally particularly resistant to disturbance due to the axis of rotation 47 of the pivot bearing 35 which coincides with the pivot axis 45. An exact positioning of the grinding point 27 can thus also be ensured on a change of the grinding angle.

Provision can also be made that the wheels 29, 31 can be pivoted about the pivot axis 45 independently of one another, in particular during the grinding, so that the grinding angle and the deburring angle can be adjusted independently of one another. This is in particular achieved in that the two pivot arms 37, 39 are rotatable about the axis of rotation 47 of the pivot bearing 35 independently of one another.

The length of each pivot arm 37, 39 can be variable so that the spacing between the wheel 29, 31 arranged at the respective pivot arm and the pivot bearing 35 is adjustable. The spacing between the grinding point 27 and the pivot bearing 35 can thus be adjusted and adapted to differently sized blades.

REFERENCE NUMERAL LIST 1 grinding apparatus
3 rotary blade
5 mount
7 mount opening
9 grinding tool
11 blade edge
13 measuring device
15 control
17 forked light barrier
19 linear motor
21 detection zone of the forked light barrier
23 cutting edge
23a section of the cutting edge
25 memory
27 grinding point
29 grinding wheel
31 deburring wheel
33 pivoting device
35 pivot bearing
37, 39 pivot arm
41 drive of the grinding wheel
43 drive of the deburring wheel
45 pivot axis
47 pivot axis of the pivot bearing
49 pivot drive
51 edge
53 deburring point
55 linear motor
I direction of rotation of the blade and of the mount
II travel path of the light barrier
III travel path of the grinding tool

What is claimed is:

1. An apparatus (1) for grinding rotary blades (3) comprising:
    at least one mount (5) for a rotary blade (3) to which the rotary blade (3) can be attached;
    at least one grinding tool (9) having a grinding wheel (29) and a deburring wheel (31),
    wherein the grinding tool (9) and the rotary blade (3) attached in the mount (5) are movable relative to one another such that a blade edge (11) extending at the periphery of the rotary blade (3) can be ground by the grinding tool (9);
    and a pivoting device (33) for the grinding tool (9),
    wherein the pivoting device (33) is designed so that the grinding tool (9) is pivotable about a pivot axis (45) which extends through a grinding point (27) at which the blade edge (11) and the grinding tool (9) contact one another during the grinding process,
    wherein the pivoting device (33) has at least one pivot bearing (35) and an axis of rotation (47) of the pivot bearing (35) coincides with the pivot axis (45) of the grinding tool (9), and
    wherein the grinding wheel (29) and the deburring wheel (31) are each attached to a pivot arm (37, 39), with both pivot arms (37, 39) being attached to the pivot bearing

(35) and being rotatable about the common axis of rotation (47) of the pivot bearing (35) for the common pivoting of the grinding wheel (29) and of the deburring wheel (31).

2. An apparatus in accordance with claim 1, wherein the grinding wheel (29) contacts the blade edge (11) at the grinding point (27) and is pivotable about the pivot axis (45).

3. An apparatus in accordance with claim 2, wherein the deburring wheel (31) forms at least approximately a V-shaped mount for the rotary blade (3) together with the grinding wheel (29) and contacts the blade edge (11) at a deburring point (53), with the deburring wheel (31) being pivotable about the pivot axis (45) together with the grinding wheel (29) and/or independently of the grinding wheel (31).

4. An apparatus in accordance with claim 3, wherein the deburring point (53) extends through the pivot axis (45).

5. An apparatus in accordance with claim 3, wherein the grinding wheel (29) and the deburring wheel (31) are arranged offset from one another along the pivot axis (45).

6. An apparatus in accordance with claim 5, wherein the grinding wheel (29) and the deburring wheel (31) are arranged offset from one another along the pivot axis (45) such that the grinding wheel (29) and the deburring wheel (31) are directly opposite one another with respect to the pivot axis (45).

7. An apparatus in accordance with claim 1, wherein the rotary blade (3) and the grinding tool (9) can be positioned relative to one another such that the pivot axis (45) is aligned at least approximately tangentially to a cutting edge (23) of the rotary blade (3) present at the respective grinding point (27).

8. An apparatus in accordance with claim 1, wherein each pivot arm (37, 39) is rotatable about the common axis of rotation (47) of the pivot bearing (35) independently of the respective other pivot arm (37, 39) for pivoting the grinding wheel (29) or deburring wheel (31) independently of the respective other wheel (29, 31).

9. An apparatus in accordance with claim 8, wherein the grinding wheel (29) and the deburring wheel (29) have a common pivot drive (49).

* * * * *